United States Patent [19]

Tatum

[11] Patent Number: 5,009,519
[45] Date of Patent: * Apr. 23, 1991

[54] SEALING ASSEMBLY FOR RELATIVELY MOVABLE MEMBERS

[76] Inventor: David M. Tatum, 9251 Burdine, No. 386, Houston, Tex. 77096

[*] Notice: The portion of the term of this patent subsequent to Aug. 9, 2005 has been disclaimed.

[21] Appl. No.: 227,624

[22] Filed: Aug. 3, 1988

Related U.S. Application Data

[63] Continuation-in-part of Ser. No. 55,126, May 28, 1987, Pat. No. 4,762,189.

[51] Int. Cl.$^5$ .................. F16C 33/76; F16J 15/26; F16J 15/28; F16J 15/38
[52] U.S. Cl. .................. 384/94; 175/372; 277/92; 277/105; 277/112; 277/125; 384/481; 384/483
[58] Field of Search .................. 277/82, 83, 84, 92, 277/95, 123, 124, 125, 143, 165, 105, 112; 384/489, 912, 94, 477, 481, 483; 175/371, 372

[56] References Cited

U.S. PATENT DOCUMENTS

| | | | |
|---|---|---|---|
| 1,413,923 | 4/1922 | Marshall | 277/143 X |
| 1,708,816 | 4/1929 | Williams | 277/143 X |
| 2,221,988 | 11/1940 | Morton | 277/223 |
| 3,057,630 | 10/1962 | Sneed | 277/165 |
| 3,359,046 | 12/1967 | Gabrovic et al. | 384/912 X |
| 3,427,051 | 2/1969 | White et al. | 277/165 X |
| 3,614,114 | 10/1971 | Traub | 277/165 |
| 3,718,338 | 2/1973 | Traub | 277/165 |
| 3,761,145 | 9/1973 | Schumacher, Jr. | 384/94 |
| 4,059,280 | 11/1977 | Eastwood | 277/165 X |
| 4,089,534 | 5/1978 | Litherland | 277/215 X |
| 4,151,999 | 5/1979 | Ringel et al. | 277/165 |
| 4,185,840 | 1/1980 | Hertz, Jr. | 277/125 |
| 4,200,343 | 4/1980 | Highsmith | 384/94 |
| 4,252,330 | 2/1981 | Crow | 384/94 X |
| 4,510,966 | 4/1985 | Parsons, Jr. | 277/83 |
| 4,762,189 | 8/1988 | Tatum | 175/371 |

FOREIGN PATENT DOCUMENTS

| 584903 | 10/1959 | Canada | 277/223 |
|---|---|---|---|
| 1067270 | 10/1959 | Fed. Rep. of Germany | 384/479 |

Primary Examiner—Allan N. Shoap

[57] ABSTRACT

A sealing member for relatively movable, e.g., rotating or reciprocating, members comprises a pair of annular rings each with a radially extending wall and an axially extending wall defining an annular seal gland. An elastic spring member compression-loaded in the seal biases the exterior surfaces against the bearing surfaces. The ring members are preferably of TEFLON, or like polytetrafluoroethylene plastic, RYTON, polyphenylene sulfide, or a soft elastic metal capable of being compressed by the spring member against the walls of the surface being sealed. The spring is a rubber or elastomeric O-ring or the like. Other spring members, such as a Belleville spring assembly or the like, may be used. This seal is characterized by its operation at elevated temperatures, i.e., up, to 1000° F.

35 Claims, 4 Drawing Sheets

SEALING ASSEMBLY FOR RELATIVELY MOVABLE MEMBERS

CROSS REFERENCE TO RELATED APPLICATION

This application is a continuation-in-part of co-pending application Ser. No. 55,126 filed, May 28, 1987, now U.S. Pat. No. 4,762,189, issued Aug. 9, 1988.

BACKGROUND OF THE INVENTION

1. Field of the Invention

This invention relates generally to a sealing member for relatively movable, e.g., rotating or reciprocating, members and more particularly to improved seal assemblies for use at high temperatures.

2. Brief Description of the Prior Art

Seal assemblies for use in applications involving a sliding, rotating or static journal member in a sleeve housing are in common use. As the seal assemblies often function in dynamic circumstances with differential pressure applied to the assemblies much effort has been directed to development and improvement of seal assemblies. The invention disclosed is applicable to the rotary cone rock bit but may be used in a variety of industrial applications.

Rotary cone rock bits in commercial use typically consist of a main bit body with multiple legs. Each leg supports a roller cone cutter on a bearing journal protruding from the leg. The cutter is typically maintained in position on the journal by a thrust-loaded ball bearing assembly. The annular space between the cutter cone and the bearing journal is filled with lubricant. Longevity of the rock bit assembly depends on maintaining appropriate clearance between the cutter cone bearing and bearing journal, and maintaining lubrication, which, in turn, is dependent on the seal assembly.

Roller cone rock bits have an axial opening through the main bit body for circulating drilling mud to wash the debris from drilling out through the bore hole. The seal assembly shields the bearing from contamination by the debris and retains the lubricant between the journal and cutter.

Problems are commonly encountered with sealed drilling bits in the following areas:

a. The destruction of the elastomer seal caused by the drill bit heating up and the elastomer seal adhering to the contacted steel members.

b. Abrasives and sharp particles contacting and thus cutting and abrading the seal, with further migration into the bearing, resulting in abrasion of the bearing and in the escape of lubrication.

c. Differential pressures on the seal assembly distorting the seal and allowing leakage.

d. Chemical decomposition of elastomer seal materials resulting from hydrogen sulfide, steam and other adverse substances encountered down hole.

PRIOR ART PATENTS

Galle, U.S. Pat. No. 3,361,499 discloses an O-ring seal.

Rife, U.S. Pat. No. 4,194,795 discloses the O-ring structure with a TEFLON shield located within the seal gland to retard shale from reaching and destroying the O-ring. Crow, U.S. Pat. No. 4,277,109, Oelke, U.S. Pat. No. 4,344,629, and Evans, et al, U.S. Pat. No. 4,452,539 disclose variations of the O-ring seal. Deane, et al, U.S. Pat. No. 4,466,622 discloses static elastomers supporting metal seal plates in lieu of dynamic O-rings.

The seal assemblies using dynamic O-rings are subject to the foregoing and other problems. The Deane patent allows contaminants into the seal gland causing abrasion and ultimate failure of the seal.

Applicant's U.S. Pat. No. 4,762,189 discloses a seal and seal shield assembly which is compression-loaded in an annular cavity to hold lubricant in the bit and protect against abrasive debris and a sealing member which comprises a pair of annular rings each with a radially extending wall and an axially extending wall defining an annular seal gland. An elastic spring member compression-loaded in the seal biases the exterior surfaces against the bearing surfaces. The ring members are preferably of TEFLON, or like polytetrafluoroethylene plastic, or a soft elastic metal capable of being compressed by the spring member against the walls of the surface being sealed. The spring is a rubber or elastomeric O-ring or the like. Other spring members, such as a Belleville spring assembly or the like, may be used. This seal is characterized by its operation at elevated temperatures.

SUMMARY OF THE INVENTION

One of the objects of the invention is to provide an improved seal and seal shield assembly for rotary or reciprocating members.

Another object of the invention is to provide a seal and seal shield assembly for a rotating, sliding or static journal member within a sleeve housing.

Still another object of the invention is to provide a seal and seal shield assembly to provide high positive pressure to the bearing surfaces to be sealed.

Still another object of the invention is to provide a seal and seal shield assembly with chemically inert contact surfaces.

Yet another object of the invention is to provide a seal and seal shield assembly with contact surfaces of self-lubricating materials.

It is a further object of the invention to provide a seal assembly having a pair of annular rings each with a radially extending wall and an axially extending wall defining an annular seal gland, with an elastic spring member compression-loaded in the seal biasing the exterior surfaces against the bearing surfaces.

Other objects of the invention will become apparent from time to time throughout the specification and claims as hereinafter related.

The above noted and other objects of the invention are accomplished by a novel sealing member for rotating or reciprocating members which comprises a pair of annular rings each with a radially extending wall and an axially extending wall defining an annular seal gland. An elastic spring member compression-loaded in the seal biases the exterior surfaces against the bearing surfaces. The ring members are preferably of TEFLON, or like polytetrafluoroethylene plastic, or a soft elastic metal capable of being compressed by the spring member against the walls of the surface being sealed. The spring is a rubber or elastomeric O-ring or the like. Other spring members, such as a Belleville spring assembly or the like, may be used. This seal is characterized by its operation at elevated temperatures.

DESCRIPTION OF A PREFERRED EMBODIMENT

Figure 1:
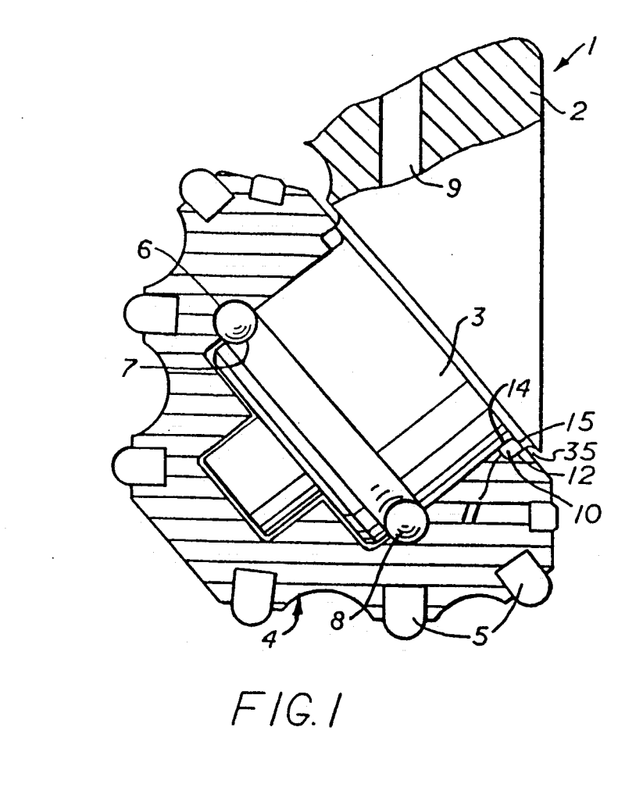
FIG. 1 is an axial sectional view of a roller cone rock bit journal and cutter cone assembly showing the seal and seal shield assembly location.

Referring to the drawings by numerals of reference, in FIG. 1 there is shown a portion of a drill bit 1 having a body (not fully shown) with a leg portion 2 with a spindle or journal 3, and a cutter cone assembly 4. The drill bit is a conventional roller cone drill bit used for drilling rock and earth formations. Rotary drill bits of this general type comprise a bit body (not shown) threadedly connected to a drill string member (not shown), the bit body having multiple legs, a portion of a typical leg 2 being shown in FIG. 1.

Roller cone cutter 4 is rotatably mounted on the journal 3 and has a plurality of inserts 5 for crushing rock and other materials in drilling. Various bearing assemblies (not shown), including friction bearings, roller bearings, and ball bearings, may be located in the bearing area between the cutter cone 4 and the journal 3.

The embodiment shown has a non-loaded, ball bearing assembly comprising a cutter cone ball bearing race 6, a journal ball bearing race 7, and a multiplicity of retainer balls 8, which are not loaded but function to retain the cone cutter 4 on the journal 3.

Each leg includes a lubrication system comprising a reservoir (not shown) located in the upper portion thereof. The reservoir communicates with a lubrication passage 9 which is connected with a multiplicity of passages in the journal to provide lubricant to the various bearing assemblies.

The seal and seal shield assembly 15 of the present invention is positioned between the cone cutter 4 and the journal 3 in the annular seal cavity 10. The annular seal cavity 10 is defined by the cutter cone seal thrust surface or journal end wall 11, the cone cutter seal bearing surface or cutter side 12, the journal seal thrust surface or journal end bearing surface 16, and the journal seal bearing surface 14. The journal seal thrust surface 16 and the journal seal bearing surface or journal peripheral surface 14 are integrally connected and form fixed walls of the annular seal cavity 10, the journal seal thrust surface 16 representing a flange surface in relation to the journal 3. The cone cutter seal thrust face 11 and the cone cutter seal bearing surface 12 are integrally connected, the said surfaces being formed by an annular recess in the open end of the axial bore of the cone cutter 4.

Figure 2:
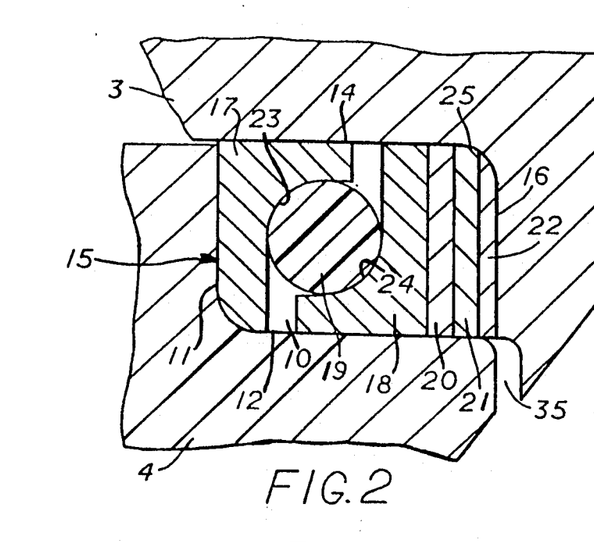
FIG. 2 is an axial sectional view of a seal assembly with a seal shield prior to compression-loading of the seal and seal shield assembly.

The seal and seal shield assembly 15 (not shown in FIG. 1) is located in the annular seal cavity 10 to retain lubricant in the bearing area between the cutter cone 4 and the journal 3 and to prevent debris in the well bore from entering the bearing area. In FIG. 2, the seal and seal shield assembly 15 of the present invention is shown in the annular seal cavity 10 in a relaxed condition prior to compression-loading. A portion of the cone cutter 4 is depicted in close relationship to a portion of the journal 3.

Figure 4:
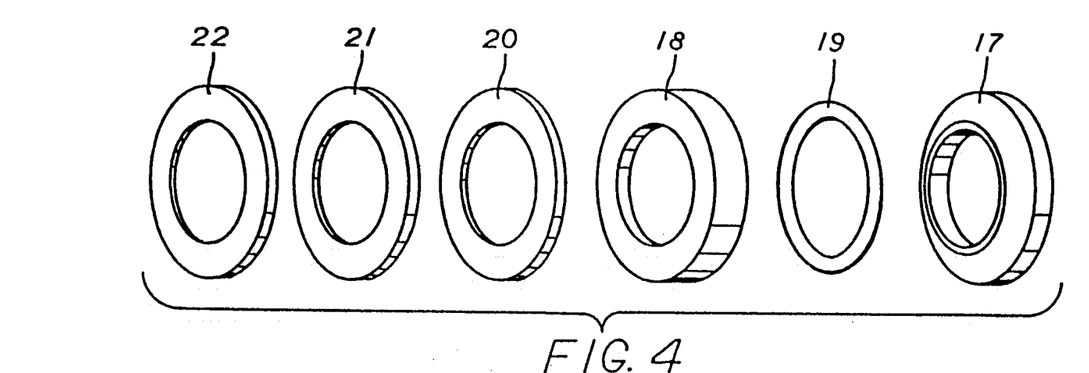
FIG. 4 is an exploded view of the seal and seal shield assembly of this invention.

The seal and seal shield assembly 15 comprises an inner seal ring 17 (a flexibly rigid material, preferably having lubricating properties, (having low frictional properties, i.e., low surface friction) such as a TEFLON alloy or Ryton TM, or an elastic, lubricating metal (having low frictional properties, i.e., low surface friction), such as lead, gold, platinum, or silver or alloys), an outer seal ring 18 (a flexibly rigid material, preferably having lubricating properties, such as a TEFLON alloy or Ryton TM, or an elastic, lubricating metal, such as lead, gold, platinum, or silver or alloys), an annular spring member 19 (an elastic or elastomeric material such as a fluoro-elastomer, Aflas TM, Viton TM or Kalrez TM, or a metallic spring such as a Belleville washer assembly, a seal shield wiper ring 20, a seal shield stiffener ring 21, and a seal shield extrusion ring 22.

Inner seal ring 17 is cylindrical with an arcuate inner surface 23. Inner seal ring 17 engages journal bearing surface 14, cone cutter seal thrust surface 11, cone cutter seal surface 12, and spring member 19. Outer seal ring 18 is cylindrical with an arcuate inner surface 24. The outer seal ring 18 engages cone cutter seal surface 12, journal bearing surface 14, wiper ring 20, and spring member 19. Annular spring member (O-ring) 19 is compressed between inner seal ring surface 23 and outer seal ring surface 24. Spring member 19 may also be of metal, such as a Belleville spring assembly. The surfaces of seal rings 17 and 18 which engage surfaces 11, 12, 14 and 16 are considered to be facing radially and axially outward relative to the inner space occupied by spring member (O-ring) 19. Likewise, the arcuate surfaces 23 and 24 are considered to be facing radially and axially inward relative to the inner space occupied by spring member (O-ring) 19.

Seal wiper ring 20 (preferably formed of a malleable material having lubricating properties and resistant to corrosion such as lead, gold, platinum, or silver or alloys), has a flat rectangular cross-section and is positioned against outer seal ring 18 with its inner radial surface against the journal seal bearing surface 14 and outer radial surface against the cone cutter seal surface 12.

A seal shield stiffener ring 21 (preferably formed of a rigid abrasion and corrosion-resistant, ferrous material such as steel or a non-ferrous material such as beryllium-copper, graphite or high temperature plastic) having a flat rectangular cross-sectional configuration with a rounded inner radial surface 25, is positioned against seal wiper ring 20 with its inner radial surface located against journal seal bearing surface 14 and its outer radial surface located against cone cutter seal surface 12.

Extrusion ring 22, with a flat rectangular cross-sectional configuration, is located against seal shield stiffener ring 21 with its inner radial surface located against the journal seal bearing surface 14 and its outer radial surface located against the cone cutter seal surface 12 and with the other axial surface located against the journal seal thrust surface 16. The extrusion ring 22 is formed of a malleable material having lubricating properties and resistant to corrosion such as lead, gold, platinum, or silver or alloys. Lead is additionally desirable in rock bit applications as it is chemically inert and not subject to corrosion by hydrogen sulfide and other chemicals that may be encountered.

Figure 3:
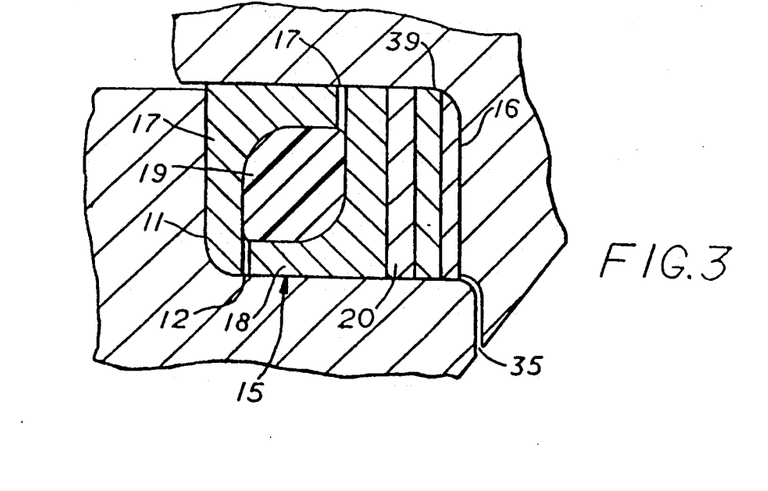
FIG. 3 is an axial sectional view of a seal assembly subsequent to compression-loading of the seal and seal shield assembly.

In FIG. 3, the seal and seal shield assembly 15 of the present invention is shown fully installed. Axial compressive forces are applied to the seal and seal shield assembly 15 by the cone cutter seal thrust surface 11 and the journal seal thrust surface 16. Spring member 19 is compressed and biases seal rings 17 and 18 against the cone cutter seal thrust surface 11 and against the journal seal bearing surface 14, the cone cutter seal bearing surface 12 and the seal shield wiper ring 20.

Seal wiper ring 20 is biased against the seal shield stiffener ring 21, the seal shield stiffener ring 21 against the seal shield extrusion ring 22, and the seal shield extrusion ring 22 against the journal seal thrust face 16. In installed configuration, therefore, the seal and seal shield assembly 15 is biased against all surfaces defining the annular seal cavity 10.

In dynamic operation, the load applied to the seal and seal shield assembly 15 deforms malleable seal shield wiper ring 20 and malleable seal shield extrusion ring 22, extruding portions of wiper ring 20 and extrusion ring 22 into any voids that may occur at adjacent contact surfaces. Rounded inner radial surface 25 of seal shield stiffener ring 21 facilitates the migration of extruded malleable material into the space between the surface 25 and the journal seal bearing surface 14. This extrusion eliminates voids at the interfaces of seal shield members and their adjacent contacted surfaces, and material from the extrusion ring 22 is slowly extruded into outer annular space or peripheral opening 35 preventing the entrance of particulate matter and other foreign materials into the annular seal cavity 10.

In dynamic operation, the various thrust and radial surfaces may exhibit relative movement, with the contact surfaces experiencing less relative friction being the dynamic interfaces. The self-lubricating properties of materials comprising the seal shield wiper ring 20 and the seal shield extrusion ring 22 facilitate dynamic interfaces at their respective surfaces.

The spring member 19 remains relatively static in relation to the inner seal ring inner surface 23 and the outer seal ring inner surface 24 under all conditions. It is therefore not subject to deterioration due to dynamic stresses. Furthermore, spring member 19 is protected from contaminants and from chemical attack by inner seal ring 17, outer seal ring 18, seal wiper ring 20, seal shield stiffener ring 21 and seal shield extrusion ring 22.

From the foregoing description it may be seen that the present seal and seal shield assembly 15 provides an efficient seal between the journal 3 and the cone cutter 4 retaining lubricating film within the bearing area between the journal 3 and the cone cutter 4 and preventing the entry of drilling debris. Seal and seal shield assembly 15 is effective for high temperature operation, i.e., up to 1000° F. It provides the sealing characteristics of an O-ring seal with the temperature resistance of TEFLON (which cannot be made into deformable elastic O-ring seals).

MULTIPLE SEAL AND SEAL SHIELD ASSEMBLIES

Figure 5:
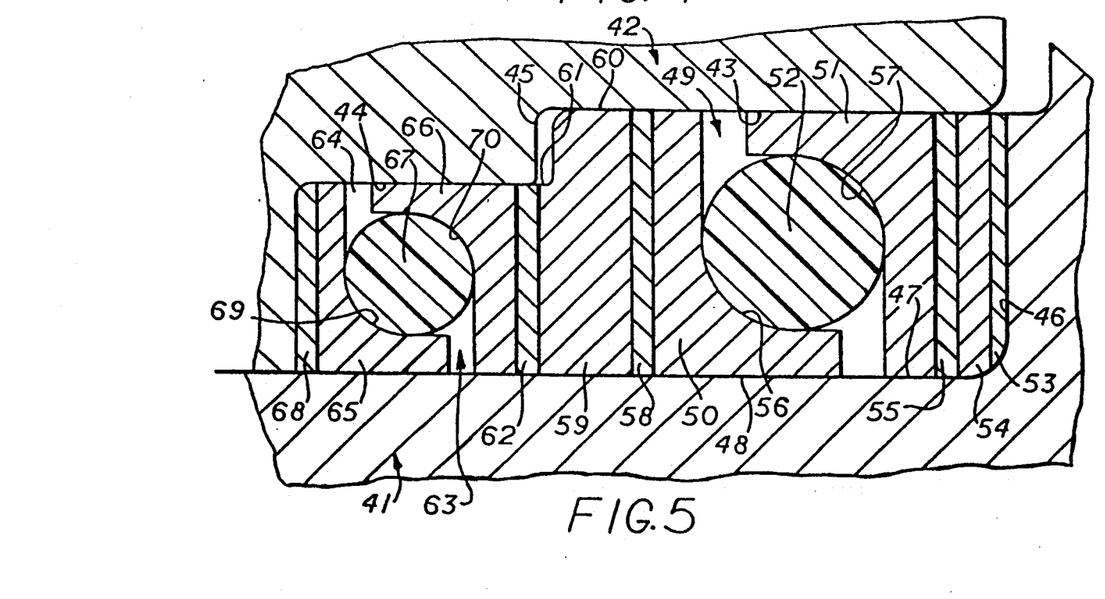
FIG. 5 is a sectional view of an embodiment of the invention having a plurality of contiguous seal assemblies.

In FIG. 5, there is shown another embodiment of the invention which illustrates the installation of multiple seal and seal shield assemblies in a cascaded configuration. A journal 41 and a cutter cone 42 are shown in cross-sectional view. Cutter cone 42 has two counterbores 43 and 44 with a shoulder 45 therebetween.

The seal and seal shield assembly of this embodiment comprises separate seal and seal shield assemblies assembled in spaced longitudinal relation between cutter cone 42 and the journal 41 in the annular seal cavities. One annular seal is defined by the cutter cone shoulder 45, the body seal bearing surface 46, the journal seal surface 47, and the surface of counterbore 43. The body seal surface 46 and the journal seal bearing surface 47 are integrally connected.

The seal and seal shield assembly 49 is located in the first annular seal cavity 48 to retain lubricant in the bearing area between cutter cone 42 and journal 41 and to prevent debris in the well bore from entering the bearing area. In FIG. 5, the seal and seal shield assembly 49 is shown in the annular seal cavity 48 in a relaxed condition prior to compression-loading. A portion of cone cutter 42 is shown in close relationship to a portion of the journal 41.

The seal and seal shield assembly 49 comprises inner seal ring 50 (a flexibly rigid material, preferably having lubricating properties, such as a TEFLON alloy or Ryton ™, or an elastic, lubricating metal, such as lead, gold, platinum, or silver or alloys), outer seal ring 51 (a flexibly rigid material, preferably having lubricating properties, such as a TEFLON alloy or Ryton ™, or an elastic, lubricating metal, such as lead, gold, platinum, or silver or alloys), annular spring member 52 (an elastic or elastomeric material such as a fluoro-elastomer, Aflas ™, Viton ™ or Kalrez ™, or a metallic spring such as a Belleville washer assembly, a seal shield wiper ring 55, seal shield stiffener ring 54, and seal shield extrusion ring 53. Spring member 52 may also be of metal, such as a Belleville spring assembly. Inner seal ring 50 is cylindrical with an arcuate inner surface 56. Inner seal ring 50 engages journal bearing surface 47, cone cutter surface 43, spring member 52, and wiper ring 58.

Outer seal ring 51 is cylindrical with an arcuate inner surface 57. The outer seal ring 51 engages cone cutter surface 43, journal bearing surface 47, wiper ring 55, and spring member 52. Annular spring member (O-ring) 52 is compressed between inner seal ring surface 56 and outer seal ring surface 57.

Seal wiper ring 55 (preferably formed of a malleable material having lubricating properties and resistant to corrosion such as lead, gold, platinum, or silver or alloys), having a flat rectangular cross-section is positioned between outer seal ring 51 and seal stiffener ring 54 with its inner radial surface located against journal seal bearing surface 47 and its outer radial surface located against cone cutter seal surface 43.

A seal shield stiffener ring 54 (preferably formed of a rigid abrasion and corrosion-resistant, ferrous material such as steel or a non-ferrous material such as beryllium-copper, graphite or high temperature plastic) of flat rectangular cross-sectional configuration is positioned against seal wiper ring 55 with its inner radial surface located against journal seal bearing surface 47 and its outer radial surface located against cone cutter seal surface 43, and its other thrust surface against extrusion ring 53.

Extrusion ring 53 (preferably formed of a malleable material having lubricating properties and resistant to corrosion such as lead, gold, platinum, or silver or alloys), with a flat rectangular cross-sectional configuration, is located against seal shield stiffener ring 54 with its inner radial surface located against journal seal bearing surface 47 and its outer radial surface located against cone cutter seal surface 43 and the other axial surface located against the journal seal thrust face 46.

Wiper ring 58, preferably formed of a malleable material having lubricating properties and resistant to corrosion such as lead, gold, platinum, or silver or alloys), with a flat rectangular cross-sectional configuration, is located against spacer ring 59 (preferably formed of a rigid abrasion and corrosion-resistant material such as steel or a non-ferrous material such as beryllium-copper, graphite or high temperature plastic) with its inner radial surface located against journal seal bearing surface 47 and its outer radial surface located against cone cutter seal surface 43 and with its other thrust surface located against seal ring 50. Spacer ring 59 has a first outside diameter 60 fitting counterbore 43 and a second, smaller outside diameter 61 fitting the second counterbore 44.

A wiper ring 62, preferably formed of a malleable material having lubricating properties and resistant to corrosion such as lead, gold, platinum, or silver or alloys), fits the second counterbore 44 and abuts the thrust face of the smaller O.D. portion 61 of spacer ring 59. The other side of wiper ring 62 abuts one side of a second seal assembly 63. The seal assembly 63 is located in the second annular seal cavity 64 and is shown in a relaxed condition prior to compression-loading. Seal and seal shield assembly 48 is effective for high temperature operation, i.e., up to 1000° F. It provides the sealing characteristics of an O-ring seal with the temperature resistance of TEFLON (which cannot be made into deformable, elastic O-ring seals).

The second seal assembly 63 comprises inner seal ring 65 (flexibly rigid material, preferably having lubricating properties, such as a TEFLON alloy or Ryton TM, or an elastic, lubricating metal, such as lead, gold, platinum, or silver or alloys), outer seal ring 66 (a flexibly rigid material, preferably having lubricating properties, such as a TEFLON alloy or Ryton TM, or an elastic, lubricating metal, such as lead, gold, platinum, or silver or alloys), annular spring member 67 (an elastic or elastomeric material such as a fluoro-elastomer, Aflas TM, Viton TM or Kalrez TM, or a metallic spring such as a Belleville washer assembly, and seal shield wiper ring 68.

Inner seal ring 65 is cylindrical with an arcuate inner surface 69. Inner seal ring 65 engages journal bearing surface 47, cone cutter surface 44, wiper ring 68 and spring member 67. Outer seal ring 66 is cylindrical with an arcuate inner surface 70. The outer seal ring 66 engages cone cutter surface 44, journal bearing surface 47, wiper ring 62, and spring member 67. Annular spring member (O-ring) 67 is compressed between inner seal ring surface 69 and outer seal ring surface 70. Seal assembly 63 is effective for high temperature operation, i.e., up to 1000° F. It provides the sealing characteristics of an O-ring seal with the chemical and temperature resistance of TEFLON (which cannot be made into deformable, elastic O-ring seals).

The embodiment depicted in FIG. 5 is particularly useful in applications involving significant pressure differentials between the environments on the inner and outer journal surfaces. Also, this embodiment, as well as the first embodiment, is applicable to sealing a rotary shaft in structures other than rotary cone drill bits. In particular, this improved bearing seal and bearing seal shield assembly provides sealing and seal protection for rotary shafts operating in an abrasive environment, such as rotary drilling, boring, and grinding tools, and the like.

SEAL AND SEAL SHIELD ASSEMBLIES FOR RECIPROCATING MEMBERS

Figure 6A:
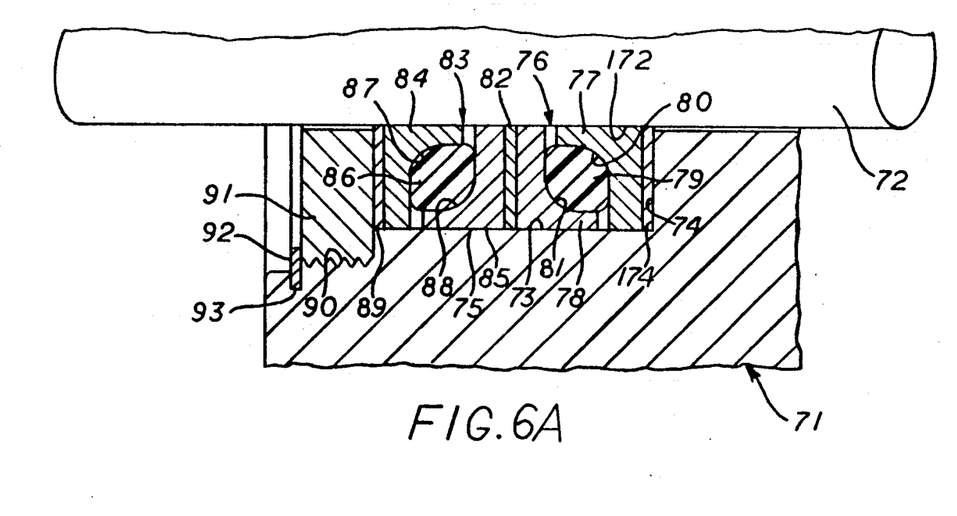
FIG. 6A is a quarter section of an embodiment of the invention having a plurality of contiguous seal assemblies arranged for sealing a reciprocating member and having a threaded retaining member.

In FIG. 6a, there is shown another embodiment of the invention which illustrates the installation of multiple seal and seal shield assemblies in a cascaded configuration for use in sealing a reciprocating member. A journal 71 and a reciprocating member 72 are shown in quarter-sectional view. Reciprocating member 72 is cylindrical without surface irregularities.

The seal and seal shield assembly of this embodiment comprises separate seal and seal shield assemblies assembled in spaced longitudinal relation between reciprocating member 72 and the journal 71 in a counterbore 73 in the journal. End wall 74 of counterbore 73 has a washer 174 positioned thereagainst. The seal and seal shield assembly 76 is located in counterbore 73 against washer 174 and comprises inner seal ring 77 (a flexibly rigid material, preferably having lubricating properties, such as a TEFLON alloy or Tyton TM, or an elastic, lubricating metal, such as lead, gold, platinum, or silver or alloys), outer seal ring 78 (a flexibly rigid material, preferably having lubricating properties, such as a TEFLON alloy or Ryton TM, or an elastic, lubricating metal, such as lead, gold, platinum, or silver or alloys), annular spring member 79 (an elastic or elastomeric material such as a fluoro-elastomer, Aflas TM, Viton TM or Kalrez TM, or a metallic spring such as a Belleville washer assembly, and a seal shield spacer ring 82. Inner seal ring 77 is cylindrical with an arcuate inner surface 80. Inner seal ring 77 engages journal bearing surface 73, reciprocating member surface 72, spring member 79, and washer 174.

Outer seal ring 78 is cylindrical with an arcuate inner surface 81. The outer seal ring 78 engages cone reciprocating member surface 72, journal counterbore surface 73, spacer ring 82 and spring member 79. Annular spring member (O-ring) 79 is compressed between inner seal ring surface 80 and outer seal ring surface 81.

The second seal assembly 83 comprises inner seal ring 84 (flexibly rigid material, preferably having lubricating properties, such as a TEFLON alloy or Tyton TM, or an elastic, lubricating metal, such as lead, gold, platinum, or silver or alloys), outer seal ring 85 (a flexibly rigid material, preferably having lubricating properties, such as a TEFLON alloy or Ryton TM, or an elastic, lubricating metal, such as lead, gold, platinum, or silver or alloys), annular spring member 86 (an elastic or elastomeric material such as a fluoro-elastomer, Aflas TM, Viton TM or Kalrez TM, or a metallic spring such as a Belleville washer assembly, and extrusion ring 89.

Inner seal ring 84 is cylindrical with an arcuate inner surface 87. Inner seal ring 84 engages journal counterbore surface 73, reciprocating member surface 72, extrusion ring 89 and spring member 86. Outer seal ring 85 is cylindrical with an arcuate inner surface 88. The outer seal ring 85 engages reciprocating member surface 72, journal counterbore surface 73, spacer ring 82, and spring member 86. Annular spring member (O-ring) 86 is compressed between inner seal ring surface 87 and outer seal ring surface 88. Seal assembly 83 is effective for high temperature operation, i.e., up to 100° F. It provides the sealing characteristics of an O-ring seal with the chemical and temperature resistance of TEFLON (which cannot be made into deformable, elastic O-ring seals).

Figure 6B:
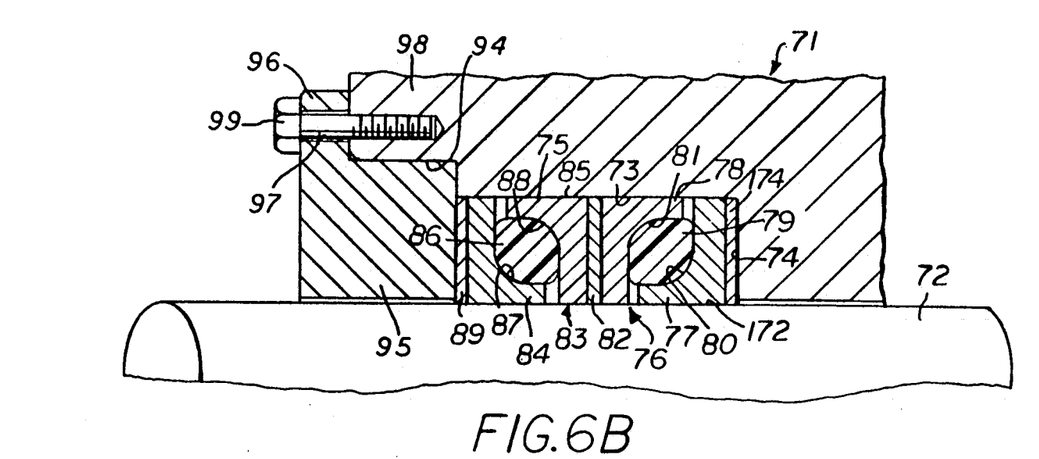
FIG. 6B is a quarter section of an embodiment of the invention having a plurality of contiguous seal assemblies arranged for sealing a reciprocating member and having a retaining member held in by machine screws.

Counterbore 72 has a further threaded counterbore 90 in which there is positioned a threaded retainer nut 91 secured against loosening by snap ring 92 in peripheral groove 93. In the embodiment of FIG. 6B, the structure in the same except that the seal assemblies are secured in place by plug 95 in a counterbore 94. Plug 95 has a peripheral flange 96 with the shank of machine screw 97, having a hex head 99, extending into the end 98 of journal 71.

This embodiment, depicted in FIGS. 6A and 6B is particularly useful in applications involving significant pressure differentials between the environments on the inner and outer journal surfaces. This embodiment is applicable to sealing all types of reciprocating member.

SEAL ASSEMBLY WITH RELIEVED SURFACES

Figure 7:
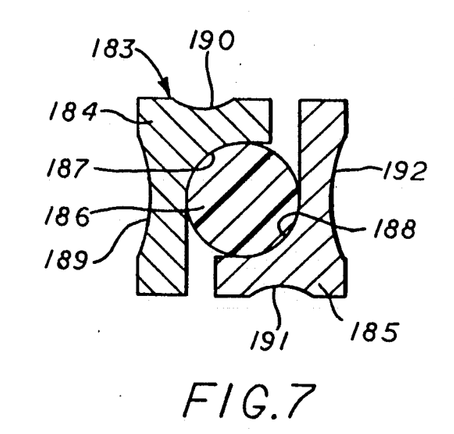
FIG. 7 is an axial sectional view of a seal assembly, with exterior surface undercuts for reduction of friction, prior to compression-loading.
Figure 8:
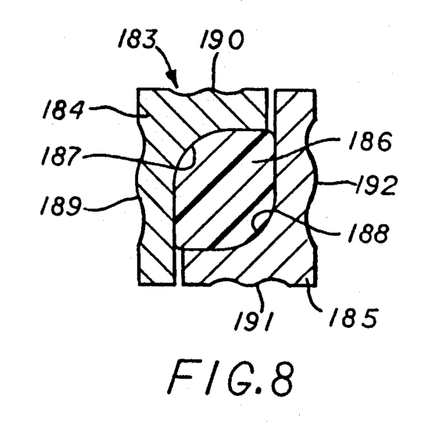
FIG. 8 is an axial sectional view of a seal assembly, with exterior surface undercuts for reduction of friction, after compression-loading.

In FIGS. 7 and 8, there is shown another embodiment of the invention in which the seal assemblies have relieved surfaces for reduction of friction in high speed installations. The seal assembly shown may be substituted in the configuration shown in FIG. 6 or in the other embodiments.

Seal assembly 183 comprises inner seal ring 184 (flexibly rigid material, preferably having lubricating properties, such as a TEFLON alloy or Ryton TM, or an elastic, lubricating metal, such as lead, gold, platinum, or silver or alloys), outer seal ring 185 (a flexibly rigid material, preferably having lubricating properties, such as a TEFLON alloy or Ryton TM, or an elastic, lubricating metal, such as lead, gold, platinum, or silver), and an annular spring member 186 (an elastic or elastomeric material such as a fluoro-elastomer, Aflas TM, Viton TM or Kalrez TM, or a metallic spring such as a Belleville washer assembly.

Inner seal ring 184 is cylindrical with an arcuate inner surface 187. When used in the configuration of FIG. 6, Inner seal ring 184 engages journal counterbore surface 73, shaft surface 172, spring member 186 and abuts stiffener washer or ring 82. Outer seal ring 185 is cylindrical with an arcuate inner surface 188. Outer seal ring 185 engages shaft surface 172, journal counterbore 73, and spring member 186. Annular spring member (O-ring) 186 is compressed between inner seal ring surface 187 and outer seal ring surface 188.

Inner seal ring 184 has its peripheral surfaces relieved at 189 and 190 for lower friction at high speed operation. Outer seal ring 185 has its peripheral surfaces relieved at 191 and 192 for lower friction at high speed operation. When used in the configuration of FIG. 6 and compressed linearly to the position shown in FIG. 8, the relieved surfaces 189, 190, 191 and 192 are bowed outward so that the frictional contact along each wall of the seal members is at the corners and middle of each wall, resulting in substantially lower friction at high speed operation.

METAL SEAL ASSEMBLY WITH BELLEVILLE SPRING

Figure 9:
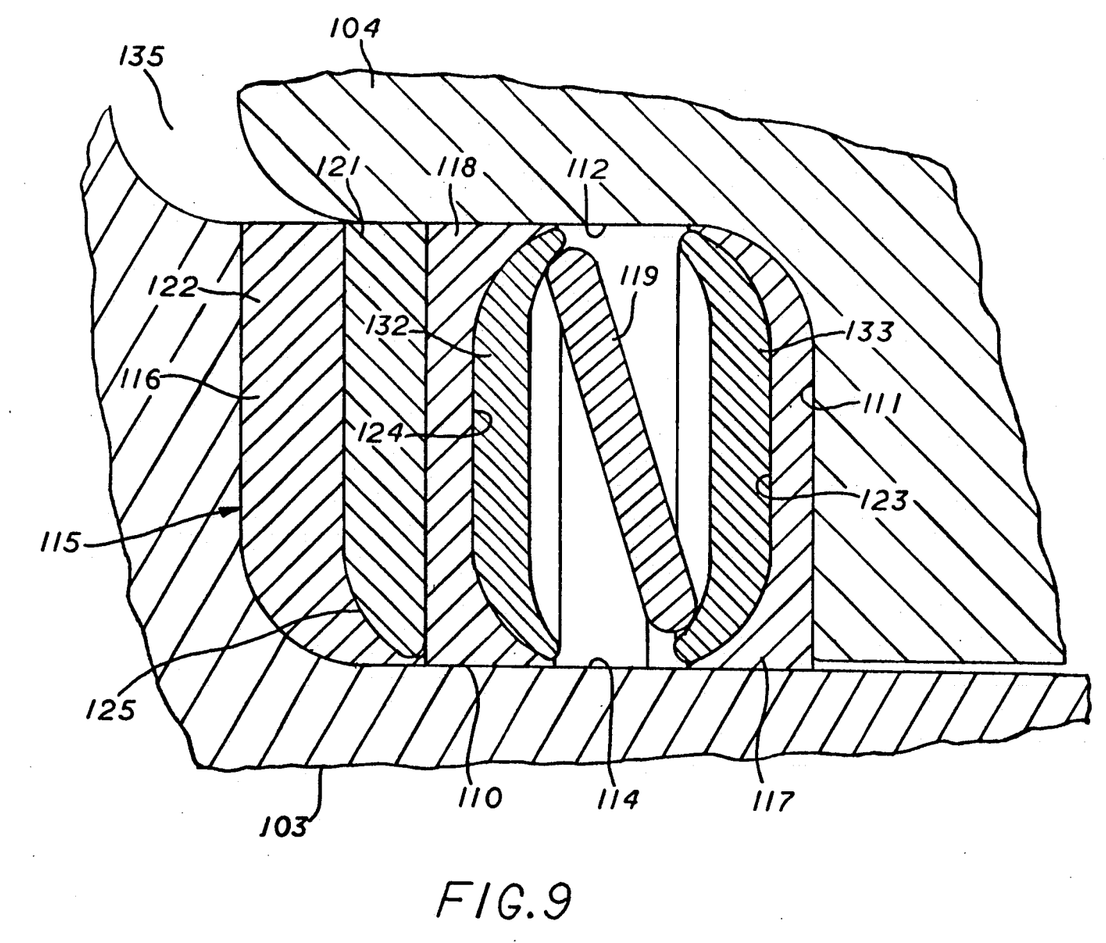
FIG. 9 is an axial sectional view of a seal assembly, with a Belleville spring assembly.

In FIG. 9, there is shown a seal assembly formed entirely of metal using Belleville spring washers as the spring means for effecting the seal. The seal and seal shield assembly 115 is located in the annular seal cavity 110 to retain lubricant in the bearing area between the cutter cone 104 and the journal 103 and to prevent debris in the well bore from entering the bearing area. The seal and seal shield assembly 115 is shown in the annular seal cavity 110 in a relaxed condition prior to compression-loading. A portion of the cone cutter 104 is depicted in close relationship to a portion of the journal 103.

The seal and seal shield assembly 115 comprises an inner seal ring or gland 117 and an outer seal ring or gland 118, both of an elastic, malleable, lubricating metal, such as lead, gold, platinum, or silver or alloys and an annular spring assembly comprising a pair of washers 132 and 133 and a Belleville spring washer 119. Assembly 115 abuts a seal shield stiffener ring 121, and a seal shield extrusion ring 122.

Seal ring 117 is cylindrical with an arcuate inner surface 123 and engages journal bearing surface 114, cone cutter seal thrust surface 111, cone cutter seal surface 112, and spring assembly comprising washers 132 and 133 and Belleville spring washer 119. Seal ring 118 is cylindrical with an arcuate inner surface 124 and engages cone cutter seal surface 112, journal bearing surface 114, stiffener ring 121, and spring assembly comprising washers 132 and 133 and Belleville spring washer 119. The spring assembly comprising washers 132 and 133 and Belleville spring washer 119 is compressed between seal ring surfaces 123 and 124. Belleville spring washer 119 is preferably a high-temperature, corrosion-resistant, non-galling alloy, such as a precipitation-hardened 718 Inconel alloy (200,000 p.s.i.). End washers 132 and 133 are a corrosion-resistant, high-strength, non-galling, wear-resistant alloy, such as severely cold-worked Nitronic 60 alloy (240,000–280,000 p.s.i. 45 Rockwell C), or nitrided steel.

Seal shield stiffener ring 121 (preferably formed of a rigid abrasion and corrosion-resistant, ferrous material such as steel or a non-ferrous material such as beryllium-copper, graphite or high temperature plastic) has a flat rectangular cross-sectional configuration with a rounded inner radial surface 125 and is positioned against extrusion ring 122 formed of a malleable material having lubricating properties and resistant to corrosion such as lead, gold, platinum, or silver or alloys. Lead is additionally desirable in rock bit applications as it is chemically inert and not subject to corrosion by hydrogen sulfide and other chemicals that may be encountered.

In dynamic operation, the load applied to the seal and seal shield assembly 115 deforms malleable seal shield extrusion ring 122, extruding portions of extrusion ring 122 into any voids that may occur at adjacent contact surfaces. This extrusion eliminates voids at the interfaces of seal shield members and their adjacent contacted surfaces, and material from the extrusion ring 122 is slowly extruded into outer annular space or peripheral opening 135 preventing the entrance of particulate matter and other foreign materials into the annular seal cavity 110.

As seal assembly 115 is compressed, Belleville spring washer 119 is flattened partially and exerts both longitudinal and radial pressure on seal rings 117 and 118 through curved washers 132 and 133. This results in a tight radial seal and end seal against all walls of cavity 110 and causes the aforementioned extrusion of ring 122.

While this invention has been described fully and completely, with special emphasis on certain preferred embodiments, it should be understood that, within the scope of the appended claims, this invention may be practiced otherwise than as specifically described herein.

I claim:

1. A sealing assembly for a plurality of surfaces defining an annular space having a longitudinal axis, for sealing relatively movable members at temperatures up to about 1000° F., comprising
   first and second annular shaped members of a hard, but elastically deformable material,
   each annular shaped member being generally of an L-shape configuration and substantially of identical shape and being assembled to be in opposed mirror relation so that substantially identical surfaces of the annular shaped members face in opposite directions, one annular shaped member having a first outer radially facing annular surface for being in substantially surface-to-surface contact with one of the relatively movable members and the other annular shaped member having a first inner radially facing annular surface for being in substantially surface-to-surface contact with the other relatively movable member, said one annular member having a second inner radially facing annular surface for being in substantially surface-to-surface contact with said other relatively movable member, said other annular shaped member having a second outer radially facing annular surface for being in substantially surface-to-surface contact with said one relatively movable member, said first outer radially facing annular surface and said first inner radially facing surface being substantially identical, said second inner facing radially annular surface and said second outer facing annular surface being substantially identical, said radially facing annular surfaces of each respective annular shaped member being joined by an axially facing annular surface for engaging in substantially surface-to-surface contacting relationship an adjacent surface to which each respective annular shaped member is axially positioned, said axially facing annular surfaces facing in opposite directions away from each other,
   said annular members having surfaces facing inwardly toward each other in being assembled and shaped to form an annular cavity and a small spacing between adjacent opposed edges of said annular members defining radially and axially offset gaps therebetween, and
   annular elastic spring means positioned in said annular cavity between and substantially surrounded on all sides thereof by said annular members except at said offset gaps and spaced from all surfaces of said annular space and said relatively movable members biasing said annular members apart in directions both radially and axially of said longitudinally axis when installed with said annular members under compression toward each other.

2. A sealing assembly according to claim 1 in which said annular members are of a hard, but elastically deformable plastic having low frictional properties.

3. A sealing assembly according to claim 2 in which said annular members are of a material selected from the group consisting of a filled polytetrafluoroethylene (TEFLON) or polyphenylene sulfide (RYTON) plastic.

4. A sealing assembly according to claim 1 in which said annular members are of an elastically deformable metal having low frictional properties.

5. A sealing assembly according to claim 4 in which said elastically deformable metal having low frictional properties is of a material selected from the group consisting of lead, gold, platinum, or silver or alloys thereof.

6. A sealing assembly according to claim 1 in which one external surface of each of said annular members is planar and another surface is cylindrical.

7. A sealing assembly according to claim 6 in which said spring means is an O-ring of rubber or elastomeric material positioned in said annular cavity and having no contact with the walls of the cavity in which said annular members are positioned.

8. A sealing assembly according to claim 6 in which each of said planar and cylindrical surfaces is relieved in an intermediate region for reduction of friction against the surfaces being sealed.

9. A sealing assembly according to claim 8 in which said spring means is an O-ring of a material selected from the group consisting of rubber or elastomeric material positioned in said annular cavity and having no contact with the walls of the cavity in which said annular members are positioned.

10. A sealing assembly according to claim 9 in which said annular members are of a material selected from the group consisting of a filled polytetrafluoroethylene (TEFLON) or polyphenylene sulfide (RYTON) plastic.

11. A sealing assembly according to claim 1 in which said spring means is an O-ring of a material selected from the group consisting of rubber or elastomeric material.

12. A sealing assembly for relatively movable parts comprising
   a journal,
   a hollow member supported in said journal for relative movement therein,
   said journal having a counterbore with an open end,
   a closure member closing said open end,
   said counterbore defining an annular seal cavity with fixed end walls comprising the end of said counterbore and the wall of said closure member and side walls comprising the side wall of said counterbore and the surface of said hollow member and having a longitudinal axis,
   first and second annular shaped members of a hard, but elastically deformable material positioned in said seal cavity, each annular shaped member being generally of an L-shape configuration and substantially of identical shape and being assembled to be in opposed mirror relation so that substantially identical surfaces of the annular shaped members face in opposite directions, one annular shaped member having a first outer radially facing annular surface for being in substantially surface-to-surface contact with one of the relatively movable members and the other annular shaped member having a first inner radially facing annular surface for being in substantially surface-to-surface contact with the other relatively movable member, said one annular member having a second inner radially facing annular surface for being in substantially surface-to-surface contact with said other relatively movable member, said other annular shaped member having a second outer radially facing annular surface for being in substantially surface-to-surface contact with said one relatively movable member, said first outer radially facing annular surface and said first inner radially facing surface being substantially identical, said second inner facing radially annular surface and said second outer facing annular surface being substantially identical, said radially facing annular surfaces of each respective annular shaped member being joined by an axially facing annular surface for engaging in substantially surface-to-surface contacting relationship an adjacent surface to which each respective annular shaped member is axially positioned, said axially facing annular surfaces facing in opposite directions away from each other, said annular members having surfaces facing inwardly toward each other in being assembled and shaped to form an annular cavity and a small spacing between adjacent opposed edges of said annular members defining radially and axially offset gaps therebetween, annular elastic spring means positioned in said annular cavity between and substantially surrounded on all sides thereof by said annular members except at said offset gaps and spaced from all walls of said seal cavity, said annular elastic spring means biasing said annular members apart in directions both radially and axially of said longitudinal axis, said annular shaped members being fitted together with external surfaces fitting the walls of said seal cavity, and means securing said closure member in a position maintaining said annular shaped members under compression so that said spring means is effective to bias the walls of said annular shaped members into sealing relation with all of the walls of said seal cavity.

13. A sealing assembly according to claim 12 in which
said annular members are of a hard, but elastically deformable plastic having low frictional properties.

14. A sealing assembly according to claim 13 in which
said plastic is of a material selected from the group consisting of a filled polytetrafluoroethylene (TEFLON) or polyphenylene sulfide (RYTON) plastic.

15. A sealing assembly according to claim 12 in which
said annular members are of a hard, but elastically deformable metal having low frictional properties.

16. A sealing assembly according to claim 15 in which
said elastically deformable metal having low frictional properties is of a material selected from the group consisting of lead, gold, platinum, or silver or alloys thereof.

17. A sealing assembly according to claim 12 in which
one external surface of each of said annular members is planar and another surface is cylindrical.

18. A sealing assembly according to claim 17 in which
said spring means is an O-ring of a material selected from the group consisting of rubber or elastomeric material positioned in said annular cavity and having no contact with the walls of the cavity in which said annular members are positioned.

19. A sealing assembly according to claim 12 in which
said spring means is an O-ring of a material selected from the group consisting of rubber or elastomeric material.

20. A sealing assembly according to claim 12 in which
said annular members are of a material selected from the group consisting of a filled polytetrafluoroethylene (TEFLON) or polyphenylene sulfide (RYTON) plastic.

21. A sealing assembly according to claim 20 in which
one external surface of each of said annular members is planar and another surface is cylindrical, and
said spring means is an O-ring of rubber or elastomeric material positioned in said annular cavity and having no contact with the walls of said seal cavity.

22. A sealing assembly according to claim 12 in which
one external surface of each of said annular members is planar and another surface is cylindrical, and
each of said planar and cylindrical surfaces is relieved in an intermediate region for reduction of friction against the surfaces being sealed.

23. A sealing assembly according to claim 22 in which
said spring means is an O-ring of a material selected from the group consisting of rubber or elastomeric material positioned in said annular cavity and having no contact with the walls of the cavity in which said annular members are positioned.

24. A sealing assembly according to claim 23 in which
said annular members are of a material selected from the group consisting of a filled polytetrafluoroethylene (TEFLON) or polyphenylene sulfide (RYTON) plastic.

25. A sealing assembly for relatively movable parts comprising
a journal,
a hollow member supported in said journal for relative movement therein,
said journal having a counterbore with an internally threaded open end,
a closure member closing said threaded open end,
said counterbore defining an annular seal cavity with fixed end walls comprising the end of said counterbore and the wall of said closure member and side walls comprising the side wall of said counterbore and the surface of said hollow member and having a longitudinal axis,
a plurality of sets of seal assemblies, each set comprising
first and second annular shaped members of a hard, but elastically deformable material positioned in said seal cavity, said annular member having surfaces facing inwardly toward each other in being assembled shaped to form an annular cavity and a small spacing between adjacent apposed edges of said annular members defining radially and axially offset gaps therebetween, annular elastic spring means positioned in said annular cavity between and substantially surrounded on all sides thereof by said annular members except at said offset gaps and spaced from all walls of said seal cavity biasing said annular members apart in directions both radially and axially of said longitudinal axis said annular shaped members being fitted together with external surfaces fitting the walls of said seal cavity, each annular shaped member being generally of an L-shape configuration and substantially of identical shape and being assembled to be in opposed mirror relation so that substantially identical surfaces of the annular shaped members face in opposite directions, one annular shaped member having a first outer radially facing annular surface for being in substantially surface-to-surface contact with one of the relatively movable members and the other annular shaped member having a first inner radially facing annular surface for being in substantially surface-to-surface contact with the other relatively movable member, said one annular member having a second inner radially facing annular surface for being in substantially surface-to-surface contact with said other relatively movable member, said other annular shaped member having a second outer radially facing annular surface for being in substantially surface-to-surface contact with said one relatively movable member, said first outer radially facing annular surface and said first inner radially facing surface being substantially identical, said second inner facing radially annular surface and said second outer facing annular surface being substantially identical, said radially facing annular surfaces of each respective annular shaped member being joined by an axially facing annular surface for engaging in substantially surface-to-surface contacting relationship an adjacent surface to which each respective annular shaped member is axially positioned, said axially facing annular surfaces facing in opposite directions away from each other, spacer means comprising a flat disc of a strong, rigid material positioned in said seal cavity between said respective sets of seal assemblies, and means securing said closure member in a position maintaining said plurality of sets of seal assemblies under compression so that the respective spring means are effective to bias the walls of said annular shaped members into sealing relation with all of the walls of said seal cavity.

26. A sealing assembly according to claim 25 in which
said spacer rigid disc is of a material selected from the group consisting of iron, steel or beryllium-copper, graphite or high temperature plastic.

27. A sealing assembly according to claim 25 in which
each said annular elastic spring means biases said annular members both radially and axially.

28. A sealing assembly according to claim 25 in which
said annular members are of a hard, but elastically deformable plastic having low frictional properties.

29. A sealing assembly according to claim 25 in which
said plastic is of a material selected from the group consisting of a filled polytetrafluoroethylene (TEFLON) or polyphenylene sulfide (RYTON) plastic.

30. A sealing assembly according to claim 25 in which
said annular members are of a hard, but elastically deformable metal having low frictional properties.

31. A sealing assembly according to claim 32 in which
said elastically deformable metal having low frictional properties is of a material selected from the group consisting of lead, gold, platinum, or silver or alloys thereof.

32. A sealing assembly according to claim 25 in which
one external surface of each of said annular members is planar and another surface is cylindrical.

33. A sealing assembly according to claim 25 in which
said spring means is an O-ring of a material selected from the group consisting of rubber or elastomeric material.

34. A sealing assembly according to claim 25 in which
one external surface of each of said annular members is planar and another surface is cylindrical, and
said spring means is an O-ring of a material selected from the group consisting of rubber or elastomeric material positioned in said annular cavity and having no contact with the walls of the cavity in which said annular members are positioned.

35. A sealing assembly according to claim 25 in which
said annular members are of a material selected from the group consisting of a filled polytetrafluoroethylene (TEFLON) or polyphenylene sulfide (RYTON) plastic.
one external surface of each of said annular members is planar and another surface is cylindrical, and
said spring means is an O-ring of a material selected from the group consisting of rubber or elastomeric material positioned in said annular cavity and having no contact with the walls of said seal cavity.

* * * * *